2,744,089

Patented May 1, 1956

2,744,089

LINEAR HIGHLY POLYMERIC POLYESTERS FROM p,p'-SULFONYL DIBENZOIC ACID AND PENTAMETHYLENE OR HIGHER GLYCOLS

John R. Caldwell, Kingsport, Tenn., assignor to Eastman Kodak Company, Rochester, N. Y., a corporation of New Jersey No Drawing. Application October 3, 1952, Serial No. 313,061

28 Claims. (Cl. 260—75)

This application relates to highly polymeric linear polyesters prepared by condensing a p,p' sulfonyl dibenzoic compound with a polymethylene glycol.

It is an object of this invention to provide novel polyesters as described herein. It is another object to provide a novel process as described herein for preparing valuable polyesters. Other objects will become apparent hereinafter.

This application is a continuation-in-part of my copending application, Serial No. 143,594, filed February 10, 1950, now U. S. Patent No. 2,614,120, dated October 14, 1952. In that application sulfonyl dibenzoic acid is called bis (dicarboxy diphenyl sulfone).

Highly polymeric esters of terephthalic acid and various glycols, for example, ethylene glycol, trimethylene glycol, hexamethylene glycol, etc., are well known, and have been used in the preparation of linear, highly polymeric polyesters having properties including that of being capable of being formed into useful filaments, fibers and the like, and having high melting points and a low degree of solubility in organic solvents. Linear polyesters prepared from other aromatic dicarboxylic acids have also been described in the prior art and contemporary art.

The known terephthalic polyesters are expensive to prepare and produce fibers which have an elastic recovery which is not sufficient to give superior properties to fabrics woven therefrom in regard to crease retention and wrinkle resistance.

It has now been found that p,p'-sulfonyl dibenzoic acid and/or its esters or its acid chloride can be condensed with a polymethylene glycol containing at least 5 carbon atoms to produce a new kind of linear polyester having highly valuable properties which are superior to those of the linear polyesters described in the prior art. Thus, my new linear polyesters can be prepared having a softening point well above 200° C. and fibers, films, etc. of exceptional properties at high temperatures can be prepared from these new polyesters. These fibers, films, etc. have exceptionally high tensile strength and elasticity. The fibers have softening points as high as 230°-250° C. and show excellent resistance to most organic solvents, even at elevated temperatures. My new polyesters can be extruded in the form of films or sheets which are especially valuable as photographic film base material because of their excellent dimensional stability and resistance to swelling by water.

My novel polyesters may contain as constituents thereof small percentages of the m,m' and/or the m,p' isomers of the p,p'-sulfonyl dibenzoic compound without significant deleterious effect on the properties of the polyesters.

These new polyesters can be prepared less expensively than those prepared from terephthalic acid or its esters. Moreover, these new polyesters have a greater elastic recovery, better crease retention when woven into fabrics and improved wrinkle resistance. According to authorities on the properties of fabrics, the elastic recovery is of great importance in crease retention and wrinkle resistance. The elastic recovery is about 80% for terephthalic polyesters when fibers are stretched from 5 to 10%. My new polyesters have practically a 100% recovery when so stretched within this range. It has been shown that the elastic recovery in the stretching range of from about 5% to about 10% is most important in determining the crease retention and wrinkle resistant properties of fibers when woven into textile fabrics.

As indicated above and as illustrated below, the melting points of my new polyesters generally average from about 50° to about 75° C. higher than the corresponding terephthalic polyesters.

These new polyesters can be processed to form fibers by melt spinning methods which have many advantages over the methods required for preparing other fibers such as the acrylonitrile fibers which have recently been commercially developed as fibers, yarns and textile fabrics. Acrylonitrile fibers have to be prepared from solutions necessitating dope preparation and solvent recovery, both of which operations are unnecessary in melt spinning methods. Moreover, melt spinning makes possible the more rapid spinning of fibers since no solvent is present.

One embodiment of my invention relates to a process for preparing a novel polyester which comprises (A) condensing a p,p' sulfonyl dibenzoic compound having the formula:

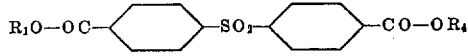

wherein $R_1$ and $R_4$ each represents a substituent selected from the group consisting of an omega-hydroxyalkyl radical containing from 3 to 12 carbon atoms and an alkyl radical containing from 1 to 6 carbon atoms, (B) with a dioxy compound selected from those compounds having the following formula:

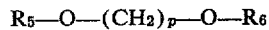

wherein $p$ represents a positive integer of from 5 to 12 inclusive and $R_5$ and $R_6$ each represents a substituent selected from the group consisting of a hydrogen atom and an acyl radical containing from 2 to 4 carbon atoms, the dioxy compound being employed in such a proportion that there is at least an equivalent amount of oxy substituents in proportion to the carboxy substituents in the overall combination of the dibenzoic compound and the dioxy compound, (C) in the presence of a condensing agent selected from the group consisting of the alkali metals, the alkaline earth metals, the oxides of these two groups of metals, the alkoxides containing from 1 to 8 carbon atoms of these two groups of metals, the carbonates and borates of these two groups of metals, lead oxide, and compounds having the following formulas:

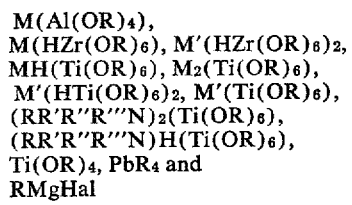

wherein M represents an alkali metal, M' represents an alkaline earth metal selected from the group consisting of magnesium, calcium and strontium, R represents an alkyl group containing from 1 to 6 carbon atoms, R', R" and R'" each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

The dioxy compound is advantageously employed in such a proportion that there are from about 1.2 to about 3 oxy substituents in proportion to the carboxy substituents in the overall combination of the dibenzoic compound and the dioxy compound. Advantageously, the elevated temperature employed during the earlier part of the condensation is from about 150° C. to about 220° C. However, higher and lower temperatures can also be employed. The upper temperature depends upon the boiling point of the glycol or glycols employed. Advantageously, the low pressure defined under (F) is less than about 15 mm. of Hg pressure. Most advantageously the pressure is less than about 5 mm. of Hg pressure. Most advantageously, the sulfonyl dibenzoic compound is a diester of p,p' sulfonyl dibenzoic acid and the dioxy compound is a glycol having the formula:

$$HO—(CH_2)_p—OH$$

wherein $p$ is defined under (B) above.

Since the dioxy compounds which can be employed in accordance with this invention are most advantageously dihydroxy compounds, such compounds will hereinafter be referred to as dihydroxy compounds although it is to be understood that dioxy compounds of the type described above are intended to be covered by this term.

The dihydroxy compounds defined above may not actually contain any free hydroxy radicals since they may be in esterified form as indicated by the formulas given. However, these hydroxy or substituted hydroxy radicals are referred to generically as hydroxy radicals or substituents. Similarly, the dibenzoic compounds defined above do not actually contain any free carboxy radicals since $R_1$ and $R_4$ are alkyl radicals; however, these CO—OR$_1$ and CO—OR$_4$ radicals are generically referred to as carboxy radicals in the description of the above process.

Furthermore, this invention covers processes as defined above wherein the sulfonyl dibenzoic compound is a diester which is formed by a preliminary step comprising condensing a sulfonyl dibenzoic acid with a dihydroxy compound which is defined under (B) and is employed in the proportions set forth under (B), at an elevated temperature, after which preliminary step the condensing agent which is defined under (C) is added and the condensation is completed as defined under (D), (E) and (F). Advantageously the elevated temperature employed during the preliminary step is substantially that at which reflux conditions subsist; however, higher and lower temperatures can also be employed. Advantageously, as indicated above the polyhydroxy compound is employed in such a proportion that there are from about 1.2 to about 3 hydroxy substituents in proportion to the carboxy substituents in the overall combination of the sulfonyl dibenzoic acid diester and the dihydroxy compound.

Linear highly polymeric polyesters can be prepared as described above from the free acidic p,p'-sulfonyl dibenzoic acid, or much more advantageously from its diesters by condensation with dihydroxy compounds. These linear polyesters have very high melting or softening points, i. e. about 180° C.–280° C. and are valuable in the manufacture of sheets, films, coatings, fibers, threads, filaments, molding plastics, etc. Linear polyesters can also be prepared employing two or more of the above defined glycols. Moreover, a substantial proportion of a short chain polymethylene glycol containing 2, 3 or 4 carbon atoms can also be employed in the preparation of these linear highly polymeric polyesters without resulting in significant deleterious effects on the stability of the polyesters obtained. When mixtures of alkylene glycols are employed containing a short chain glycol, the ratio of short chain alkylene glycol (2, 3, or 4 carbon atoms) to long chain alkylene glycol (5–12 carbon atoms) is adjusted so that the melting point of the polyester will lie below about 300° C. in order to minimize thermal decomposition. This ratio is determined by the nature of the long chain glycol. For example, when a 10 or 12 carbon atom glycol is employed the amount of short chain glycol used may be as high as 50–60 molecular percent. When a 5 or 6 carbon atom glycol is employed, it is preferred to use no more than about 40 to 50 mol. percent of the short chain glycol.

As illustrative of the invention, linear polyesters can be prepared by the following chemical reaction which is conducted in the presence of a catalytic condensing agent such as an alkali metal or alkaline earth metal or a hydroxide or alkoxide thereof or other compounds as defined above. The reaction set forth below is obviously an ester-interchange reaction wherein an alkyl ester of the acid enters into an interchange with a glycol or a glycol ester to form a polyester and an alcohol or alcohol ester. Accordingly, all of the various catalysts described herein contribute to such an ester-interchange reaction and can be conveniently called ester-interchange catalysts. This equation as given does not endeavor to encompass all the possible ramifications and side reactions that may be involved, but is merely presented as illustrative of what most probably may occur.

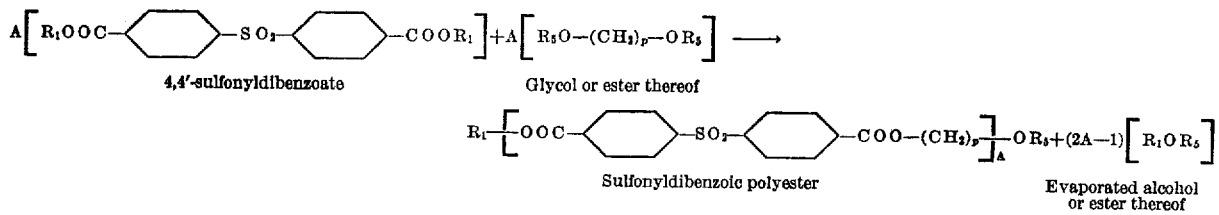

4,4'-sulfonyldibenzoate     Glycol or ester thereof

Sulfonyldibenzoic polyester     Evaporated alcohol or ester thereof wherein $R_1$, $R_5$ and $p$ have been defined above and $A$ represents the number of molecules being condensed to form the polyester.

The products of this invention are linear highly polymeric polyesters having melting points of from about 180° C. (generally at least 200° C.) up to about 270°–280° C. containing the following repeating unit:

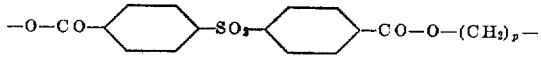

wherein $p$ is defined hereinabove. As indicated hereinbefore, these polyesters can also contain a minor proportion (not more than about 50–60 mol. percent) of the following repeating unit:

wherein $t$ represents a positive integer of from 2 to 4. These polyesters are capable of being formed into fibers (such as by melt spinning methods) which can then be cold drawn by conventional means to from about 3 to 6 times their originally spun length whereby these fibers develop strong, elastic and highly valuable properties.

Examples of the polymethylene glycols useful in accordance with this invention (wherein the hydroxy radicals are positioned at the two ends of the alkylene chain) include 1,5-pentylene glycol, 1,6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. Mixtures of two or more of these dihydroxy compounds can also be employed. Moreover, a minor proportion of ethylene glycol, 1,3-propylene glycol or 1,4-butylene glycol can also be present as a modifier. If too much of these last three glycols containing less than five carbon atoms is present, the polyester obtained will be unstable in its molten condition undergoing degradation and resulting in an unsatisfactory product.

The catalytic condensing agents which can be employed have been described above. From about 0.005% to about 0.2% of these catalysts based on the weight of the reactants being condensed can be employed. Higher or lower percentages can also be employed. Generally, from about 0.01 to about 0.06% of the catalytic condensing agent can be advantageously employed based on the weight of the diesters being condensed.

The temperature at which polyesterification can be conducted is dependent upon the specific reactants involved in any given reaction. In general, the reaction mixture can be heated at from about 150° to about 220° C. for from approximately two to three hours in an inert atmosphere (e. g. nitrogen or hydrogen); the mixture can then be heated at from about 225°–240° to about 280°–310° C. in the same atmosphere for approximately one to two hours. Finally, the pressure can be greatly reduced to form a vacuum (less than about 15 mm. of Hg pressure but preferably on the order of less than 5 mm. of Hg pressure) while the temperature is maintained in the same range (225°–310° C.); these conditions are advantageously maintained for approximately four to six additional hours. The conditions can be varied considerably depending upon the degree of polyesterification desired, the ultimate properties sought, the stability of the polyester being produced and the use for which the product is intended. Thus, partial substitution of the polymethylene glycol with a glycol containing less than five carbon atoms may necessitate variations in these conditions of temperature, pressure and time periods required. The introduction of other modifiers into the reaction will involve variations in the conditions also.

Polyesters derived from p,p'-sulfonyldibenzoic acid and glycols containing less than five carbon atoms between the hydroxyl groups melt above 300° C. and decompose at or near the melting point. For this reason they cannot be made by the process described herein and are excluded from this invention. In practice, it has been found desirable to employ such lower glycols in mixtures with other glycols containing at least five carbon atoms or with ether glycols (see my copending application, Serial No. 313,067 filed on even date herewith) to give polyesters that can be handled at temperatures below about 300° C.

The sulfonyl dibenzoic compound employed can be used in the form of its diesters e. g. methyl, ethyl, propyl, isopropyl, butyl, etc. esters. It can also be used in the form of a partial glycol ester which can be obtained by heating the acid with an excess of a glycol.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

It has been found that the type of catalyst used has an important bearing upon the properties of the final product. Although most of the catalysts cited in the prior art may be used, it has been found that certain catalysts give superior results. The aluminum and titanium alkoxide complexes described in copending applications filed on even date herewith are especially valuable for the preparation of the polyesters described here. Moreover, novel tin catalysts have also been found to be especially effective. See Caldwell Serial No. 313,072, Serial No. 313,078, Caldwell and Reynolds Serial No. 313,077, Wellman and Caldwell Serial No. 313,074, Serial No. 313,075 and Serial No. 313,076, and Wellman Serial No. 313,073 for a description of especially advantageous catalytic condensing agents.

It is important to exclude oxygen and moisture at all stages of the condensation reaction. Inert atmospheres which can be advantageously employed include nitrogen, hydrogen, helium, etc. Substantially anhydrous reactants can also be advantageously employed although this is not essential especially if any water is removed in the earlier stages of the condensation.

The acid chloride of sulfonyl dibenzoic acid can also be employed, i. e., when $OR_1$ and $OR_4$ each represents a Cl atom. When the acid chloride of sulfonyl dibenzoic acid is used, best results are generally obtained by employing an exactly equivalent amount of glycol in the absence of a catalytic condensing agent. The initial temperature to start the condensation can be about 100° C.

In accordance with this invention, highly polymeric linear polyesters can be prepared by condensing a sulfonyl dibenzoic compound with a polymethylene glycol or derivative thereof as defined above. Diesters of p,p'-sulfonyl dibenzoic acid are most advantageously employed. Glycols containing secondary or tertiary groups result in products having lower melting points with the consequence that they do not possess the usefulness of my products. The comparison is illustrated by the following data. The polyesters of p,p'-sulfonyl dibenzoic acid with ethylene glycol, 1,2-propylene glycol, and 1,3-propylene glycol were prepared and their melting points determined. In order to further illustrate the improvement in my linear polyesters over the prior art, data is also included as to linear polyesters of terephthalic acid, this data is set forth in an article by Carpenter, J. Soc. Dyers Colourists 65, 478 (1949) and in Hill & Walker, J. Polymer Sci., 3, 609 (1948)

| Acid Employed | Glycol Employed | Polyester Melting Point, ° C. |
|---|---|---|
| p,p'-Sulfonyl dibenzoic acid | Ethylene | 340° with decomp. |
| Do | 1,2-Propylene | 180°. |
| Do | 1,3-Propylene | 320° with decomp. |
| Terephthalic acid | Ethylene | 250°. |
| Do | 1,2-Propylene | 122°. |
| Do | 1,3-Propylene | 221°. |

From the data it can be seen that the presence of a secondary hydroxyl group, as found in 1,2-propylene glycol, lowers the melting point of the polyester by more than a hundred degrees.

The polyesters of my invention have softening points generally above 180°–200° C. (as high as about 280° C.) and are especially suitable for the manufacture of fibers and films having exceptionally high tensile strength and elasticity. Polyesters prepared from p,p'-sulfonyl dibenzoic acid diesters are especially valuable for the production of fibers by the melt spinning process. Fibers obtained show excellent resistance to most organic solvents even at elevated temperatures.

When extruded in the form of films or sheets these polyesters are especially valuable in the preparation of photographic film base materials because of their excellent dimensional stability and resistance to swelling by water. Such photographic films retain their original dimensions to a very high degree despite the effects of changes in the humidity of the atmosphere, the treatment of the film with developing solutions, etc. The improvement is surprisingly great in comparison to conventional film made from cellulose derivatives such as the various alkanoic esters or the nitrate; moreover, no plasticizer is needed in conjunction with these novel polyesters.

This invention can be further illustrated by the following examples; in addition to these examples it is apparent that other variations and modifications thereof can be adapted to obtain similar results:

*Example 1 (decamethylene glycol)*

Four hundred and twenty grams (1.0 mole) p,p'-sulfonyldibenzoic acid dibutyl ester and 360 g. (2.0 mole) 1,10-decamethylene glycol were placed in a reaction vessel equipped with a stirrer, a short distilling column, and an inlet tube for purified hydrogen. A piece of magnesium ribbon ¼ inch long was heated in iodine vapors to activate it and introduced into the vessel as a catalyst. The mixture was stirred at 200–220° C. in an atmosphere of pure hydrogen. Butyl alcohol was distilled from the reaction mixture as the ester interchange proceeded. After 3 to 4 hours, the evolution of butyl alcohol came practically to a stop, and the temperature was then raised to 250–260° C. and held for 2 hours. A vacuum of 0.5 to 1.0 mm. was applied and the heating and stirring were continued for 5 to 6 hours. A colorless product having an inherent viscosity of 0.60 in a mixture of 60% phenol-40% tetrachlorethane was obtained. This polyester is soluble in gamma-butyrolactone, ethylene carbonate, and dimethyl sulfolane at 120–160° C. but separates from solution when cooled to room temperature. In the crystalline form, the product shows a melting point of 200–210° C. on the hot stage of a polarizing microscope. When extruded as filaments and drafted, this polyester sticks on a hot bar at 170–180° C. This polyester is valuable for the production of photographic film base. It can also be used for electrical insulation.

*Example 2 (hexamethylene glycol)*

Three hundred and seventy-two grams (1.0 mole) of p,p'-sulfonyldibenzoic acid diethyl ester and 160 g. (1.5 mole) 1,6-hexamethylene glycol were placed in a reaction vessel equipped with a short distillation column, a stirrer, and an inlet for purified nitrogen. A solution of 0.2 g. sodium titanium butoxide in 5 cc. butyl alcohol was added as a catalyst. The reaction mixture was stirred at 210–220° C. in a stream of pure nitrogen until the distillation of ethyl alcohol was 80–90% complete. The temperature was then raised to 275–280° and maintained for 1 hour. A vacuum of 1.0 to 2.0 mm. was applied, while stirring was continued for 1 to 1.5 hours. The product obtained had an inherent viscosity of 0.60 to 0.70 in a mixture of 40% tetrachlorethane–60% phenol. This polymer is especially valuable for the production of textile fibers. In the crystalline form it melts at 270–280°. When extruded as fibers and drafted, it sticks to the hot bar at 230–240° C. Fibers having an elongation of 20–25% and tensile strength of 4 to 5 grams per denier are obtained by suitable spinning, drafting, and heat treating procedures. The polymer is soluble in γ-butyrolactone, ethylene carbonate, and dimethyl sulfolane at 140–160° C. It precipitates when the solution is cooled.

*Example 3 (hexamethylene glycol)*

Eighty-four g. (0.2 mol.) of p,p'-sulfonyl dibenzoic acid butyl ester and 36 g. (0.3 mol.) of 1,6-hexanediol were placed in a vessel equipped with a variable speed anchor stirrer, a short distillation column and a gas inlet tube for the entrance of purified hydrogen. Two cc. of n-butyl alcohol containing 0.1 g. sodium aluminum butoxide was added. The mixture was heated in a metal bath at 200–210° C. and stirred at 100–120 R. P. M. while pure hydrogen was passed over the surface. Butyl alcohol distilled off rapidly and the ester interchange was practically complete in 40 minutes. The temperature was then raised to 280–285° C. over a period of 15 minutes and heating was continued for an additional 10–15 minutes. Some of the excess glycol was distilled off during this stage. The hydrogen gas was shut off, and a vacuum of about 1 mm. was applied. The melt rapidly increased in viscosity and in about 15 minutes it was necessary to reduce the stirrer speed to 40 R. P. M. As the viscosity increased, the stirrer speed was gradually reduced. After a total time of 30–40 minutes under vacuum, the melt had become too viscous to stir and the reaction was stopped. The melt was clear and colorless. After cooling slowly, the product obtained was hard and opaque, due to crystallinity; in another similar experiment, the melt was suddenly cooled or quenched and had a tendency to remain amorphous and transparent. On a hot stage, in polarized light, the crystalline material shows a melting point of 270–280° C. The inherent viscosity in 60% phenol–40% tetrachlorethane is 0.70–0.80. Fibers can be pulled from the melt and cold-drawn 500–600 per cent. They stick on a hot bar at 230–240° C. The polyester also gives valuable sheets and films.

*Example 4 (pentamethylene glycol)*

One hundred grams p,p'-sulfonyl dibenzoic acid ethyl ester and 40 grams 1,5-pentanediol were placed in a reaction vessel equipped with a stirrer, a short distillation column, and an inlet tube for purified nitrogen. Five cc. of ethyl alcohol containing 0.4 g. potassium aluminum ethylate was added and the mixture was heated at 180–200° C. with stirring. After 1 hour, the distillation of ethyl alcohol ceased, and the temperature was raised to 280–285° C. where it was held for 20 minutes. A vacuum of 0.5 to 1.0 mm. was applied for 1 hour, while the temperature was maintained at 280–285° C. A colorless product having an inherent viscosity of 0.80–0.90 in 60% phenol–40% tetrachlorethane solution was obtained. Fibers pulled from the melt and cold drawn 400–500 per cent show a sticking temperature of 240–250° C. The product is also useful for films and sheets.

*Example 5 (pentamethylene glycol)*

A mixture of 110 g. of dibutyl ester of diphenyl sulfone 4,4'-dicarboxylic acid, 110 g. 1,5-pentanediol and 5 cc. catalyst (which was made by dissolving 1 gram of lithium aluminum hydride in 100 cc. of absolute ethanol) was heated at 200–270° for one and one half hours under a nitrogen atmosphere. Butanol distilled off during this period. Excess glycol was then distilled under a water-pump vacuum. A stirrer was employed and the reaction continued at 290° at 1 mm. pressure. Within fifteen minutes a clear, colorless polymer had become wrapped around the stirrer shaft. It had an intrinsic viscosity of 0.70 in a 60:40 phenol-tetrachlorethane mixture.

*Example 6 (hexamethylene glycol)*

Eighty-four grams (0.2 mol) of p,p'-sulfonyldibenzoic acid butyl ester and 36 g. (0.3 mol) of 1,6-hexanediol were placed in a vessel equipped with a variable speed stirrer of the anchor type, a short distillation column, and a gas inlet tube for purified hydrogen. Two cc. of n-butyl alcohol containing 0.01 g. of NaH(Zr(OC₄H₉)₆) was added. The mixture was heated in a metal bath at 200–210° C. and stirred at 100–120 R. P. M. while pure hydrogen was passed over the surface. Butyl alcohol distilled off rapidly and the ester interchange was practically complete in 30 minutes. The temperature was then raised to 270–280° C. in 15 minutes and heating was contined for 10–15 minutes. Some of the excess glycol was distilled off at this stage. The hydrogen gas was shut off, and a vacuum of about 1 mm. was applied. The melt rapidly increased in viscosity and in about 15 minutes it was necessary to reduce the stirrer speed to 40 R. P. M. As the viscosity increased, the stirrer speed was gradually reduced. After a total time of 30–40 minutes under vacuum, the melt had become too viscous to stir and the reaction was stopped. The melt was clear and colorless. After cooling slowly, the product obtained was hard and opaque due to crystallinity; in another experiment the melt was suddenly cooled or quenched and had a tendency to remain amorphous and transparent. On a hot stage, in polarized light, the crystalline material shows a melting point of 270–280° C. The inherent viscosity in 60% phenol–40% tetrachlorethane is 0.70–0.80. Fibers can be pulled from the melt and cold-drawn 500–600%. They stick on a hot bar at 230–240° C. The polyester also gives valuable sheets and films.

*Example 7 (pentamethylene glycol)*

One hundred grams p,p'-sulfonyldibenzoic acid ethyl ester and 40 g. 1,5-pentanediol were placed in a reaction vessel equipped with a stirrer, a short distillation column and an inlet tube for purified nitrogen. Five cc. of ethyl alcohol containing 0.4 g. of KH(Zr(OC$_2$H$_5$)$_6$) was added and the mixture was heated at 180–200° C. with stirring. After 1 hour, the distillation of ethyl alcohol ceased, and the temperature was raised to 280–285° C. where it was held for 20 minutes. A vacuum of 0.5 to 1.0 mm. was applied for 1 hour, while the temperature was maintained at 280–285° C. A colorless product having an inherent viscosity of 0.80–0.90 in 60% phenol–40% tetrachlorethane solution was obtained. Fibers pulled from the melt and cold drawn 400–500% show a sticking temperature of 240–250° C. The product is also useful for films and sheets.

Example 8 (hexamethylene glycol)

Eighty-four grams (0.2 mol) of p,p'-sulfonyl dibenzoic acid butyl ester and 36 g. (0.3 mol) of 1,6-hexanediol were placed in a vessel equipped with a variable speed stirrer of the anchor type, a short distillation column, and a gas inlet tube for purified hydrogen. Two cc. of n-butyl alcohol containing 0.1 g. of NaH(Ti(OC$_4$H$_9$)$_6$) was added. The mixture was heated in a metal bath at 200–210° C. and stirred at 100–120 R. P. M. while pure hydrogen was passed over the surface. Butyl alcohol distilled off rapidly and the ester interchange was practically complete in 30 minutes. The temperature was then raised to 270–280° in 15 minutes and heating was continued for 10–15 minutes. Some of the excess glycol was distilled at this stage. The hydrogen gas was shut off, and a vacuum of about 1 mm. was applied. The melt rapidly increased in viscosity and in about 15 minutes it was necessary to reduce the stirrer speed to 40 R. P. M. As the viscosity increased, the stirrer speed was gradually reduced. After a total time of 30–40 minutes under vacuum, the melt had become too viscous to stir and the reaction was stopped. The melt was clear and colorless. After cooling slowly, the product obtained was hard and opaque, due to crystallinity. On a hot stage, in polarized light, the crystalline material shows a melting point of 270–280° C. The inherent viscosity in 60% phenol–40% tetrachlorethane is 0.70–0.80. Fibers can be pulled from the melt and cold-drawn 500–600 per cent. They stick on a hot bar at 230–240° C. The polyester also gives valuable sheets and films.

Example 9 (pentamethylene glycol)

One hundred grams p,p'-sulfonyl dibenzoic acid ethyl ester and 40 g. 1,5-pentanediol were placed in a reaction vessel equipped with a stirrer, a short distillation column, and an inlet tube for purified nitrogen. Five cc. of ethyl alcohol containing 0.4 g. LiH(Ti(OC$_2$H$_5$)$_6$) was added and the mixture was heated at 180–200° C. with stirring. After 1 hour, the distillation of ethyl alcohol ceased, and the temperature was raised to 280–285° C. where it was held for 20 minutes. A vacuum of 0.5 to 1.0 mm. was applied for 1 hour, while the temperature was maintained at 280–285° C. A colorless product having an inherent viscosity of 0.80–0.90 in 60% phenol–40% tetrachlorethane solution was obtained. Fibers pulled from the melt and cold drawn 400–500 per cent show a sticking temperature of 240–250° C. The product is also useful for films and sheets.

Example 10 (hexamethylene glycol)

Eighty-four grams (0.2 mol) of p,p'-sulfonyl dibenzoic acid butyl ester and 36 g. (0.3 mol) of 1,6-hexanediol were placed in a vessel equipped with a variable speed stirrer of the anchor type, a short distillation column, and a gas inlet tube for purified hydrogen. Two cc. of n-butyl alcohol containing 0.1 g. of Mg(Ti(OC$_4$H$_9$)$_6$) was added. The mixture was heated in a metal bath at 200–210° C. and stirred at 100–120 R. P. M. while pure hydrogen was passed over the surface. Butyl alcohol distilled off rapidly and the ester interchange was practically complete in 30 minutes. The temperature was then raised to 270–280° in 15 minutes and heating was continued for 10–15 minutes. Some of the excess glycol distilled off at this stage. The hydrogen gas was shut off, and a vacuum of about 1 mm. was applied. The melt rapidly increased in viscosity and in about 15 minutes it was necessary to reduce the stirrer speed to 40 R. P. M. As the viscosity increased, the stirrer speed was gradually reduced. After a total time of 30–40 minutes under vacuum, the melt had become too viscous to stir and the reaction was stopped. The melt was clear and colorless. After cooling slowly, the product obtained was hard and opaque, due to crystallinity. If the melt had been suddenly cooled or quenched, it would have had a tendency to remain amorphous and transparent. On a hot stage, in polarized light, the crystalline material shows a melting point of 270–280° C. The inherent viscosity in 60% phenol–40% tetrachlorethane is 0.70–0.80. Fibers can be pulled from the melt and cold drawn 500–600 per cent. They stick on a hot bar at 230–240° C. The polyester also gives valuable sheets and films.

Example 11 (pentamethylene glycol)

One hundred grams p,p'-sulfonyl dibenzoic acid ethyl ester and 40 g. 1,5-pentanediol were placed in a reaction vessel equipped with a stirrer, a short distillation column, and an inlet tube for purified nitrogen. Five cc. of ethyl alcohol containing 0.4 g. Mg(HTi(OC$_2$H$_5$)$_6$) was added and the mixture was heated at 180–200° C. with stirring. After 1 hour, the distillation of ethyl alcohol ceased, and the temperature was raised to 280–284° C. where it is held for 20 minutes. A vacuum of 0.5 to 1.0 mm. was applied for 1 hour, while the temperature was maintained at 280–285° C. A colorless product having an inherent viscosity of 0.80–0.90 in 60% phenol–40% tetrachlorethane solution was obtained. Fibers pulled from the melt and cold drawn 400–500 per cent show a sticking temperature of 240–250° C. The product is also useful for films and sheets.

Example 12 (hexamethylene glycol)

Eighty-four grams (0.2 mol) of p,p'-sulfonyl dibenzoic acid butyl ester and 36 g. (0.3 mol) of 1,6-hexanediol were placed in a vessel equipped with a variable speed stirrer of the anchor type, a short distillation column, and a gas inlet tube for purified hydrogen. Two cc. of n-butyl alcohol containing 0.1 g. of tetramethyl ammonium titanium butoxide, ((CH$_3$)$_4$N)H(Ti(OBu)$_6$) was added. The mixture was heated in a metal bath at 200–210° C. and stirred at 100–120 R. P. M. while pure hydrogen was passed over the surface. Butyl alcohol distilled off rapidly and the ester interchange was practically complete in 30 minutes. The temperature was then raised to 270–280° in 15 minutes, and heating was continued for 10–15 minutes. Some of the excess glycol was distilled off at this stage. The hydrogen gas was shut off, and a vacuum of about 1 mm. was applied. The melt rapidly increased in viscosity, and in about 15 minutes, it was necessary to reduce the stirrer speed to 40 R. P. M. As the viscosity increased, the stirrer speed was gradually reduced. After a total time of 30–40 minutes under vacuum, the melt had become too viscous to stir and the reaction was stopped. The melt was clear and colorless. After cooling slowly, a product was obtained which was hard and opaque, due to crystallinity. On a hot stage, in polarized light, the crystalline material shows a melting point of 270–280° C. The inherent viscosity in 60% phenol-40% tetrachlorethane is 0.70–0.80. Fibers can be pulled from the melt and cold-drawn 500–600%. They stick on a hot bar at 230–240° C. The polyester also gives valuable sheets and films.

Example 13 (pentamethylene glycol)

One hundred grams p,p'-sulfonyl dibenzoic acid ethyl ester and 40 g. 1,5-pentanediol were placed in a reaction vessel equipped with a stirrer, a short distillation column, and an inlet tube for purified nitrogen. Five cc. of ethanol containing 0.4 g. ((C₂H₅)₄N)H(Ti(OC₂H₅)₆) was added, and the mixture was heated at 180–200° C. with stirring. After one hour, the distillation of ethyl alcohol ceased, and the temperature was raised to 280–285° C. where it was held for 20 minutes. A vacuum of 0.5 to 1.0 mm. was applied for one hour, while the temperature was maintained at 280–285° C. A colorless product having an inherent viscosity of 0.80–0.90 in 60% phenol-40% tetrachlorethane solution was obtained. Fibers pulled from the melt and cold-drawn 400–500% show a sticking temperature of 240–250° C. The product is also useful for films and sheets.

*Example 14 (hexamethylene glycol)*

Eighty-four g. (0.2 mol) of p,p'-sulfonyl dibenzoic acid butyl ester and 36 g. (0.3 mol) of 1,6-hexanediol were placed in a vessel equipped with a variable speed stirrer of the anchor type, a short distillation column, and a gas inlet tube for purified hydrogen. Two cc. of n-butyl alcohol containing 0.1 g. of titanium tetrabutylate, Ti(OC₄H₉)₄, was added. The mixture was heated in a metal bath at 200–210° C. and stirred at 100–120 R. P. M. while pure hydrogen was passed over the surface. Butyl alcohol distilled off rapidly and the ester interchange was practically complete in 30 minutes. The temperature was then raised to 270–280° in 15 minutes and heating was continued for 10–15 minutes. Some of the excess glycol distilled off at this stage. The hydrogen gas was shut off and a vacuum of about 1 mm. was applied. The melt rapidly increased in viscosity and in about 15 minutes it was necessary to reduce the stirrer speed to 40 R. P. M. As the viscosity increased the stirrer speed was gradually reduced. After a total time of 30–40 minutes under vacuum, the melt had become too viscous to stir and the reaction was stopped. The melt was clear and colorless. After cooling slowly the product obtained was hard and opaque due to crystallinity. On a hot stage, in polarized light, the crystalline material shows a melting point of 270–280° C. The inherent viscosity in 60% phenol-40% tetrachlorethane is 0.70–0.80. Fibers can be pulled from the melt and cold-drawn 500–600%. They stick on a hot bar at 230–240° C. The polyester also gives valuable sheets and films.

*Example 15 (pentamethylene glycol)*

One hundred g. p,p'-sulfonyl dibenzoic acid ethyl ester and 40 g. 1,5-pentanediol were placed in a reaction vessel equipped with a stirrer, a short distillation column, and an inlet tube for purified nitrogen. Five cc. of ethanol containing 0.4 g. Ti(OC₂H₅)₄ was added and the mixture was heated at 180–200° C. with stirring. After 1 hour, the distillation of ethyl alcohol ceased, and the temperature was raised to 280–285° C. where it was held for 20 minutes. A vacuum of 0.5 to 1.0 mm. was applied for 1 hour while the temperature is maintained at 280–285° C. A colorless product having an inherent viscosity of 0.80–0.90 in 60% phenol-40% tetrachlorethane solution was obtained. Fibers pulled from the melt and cold-drawn 400–500% show a sticking temperature of 240–250° C. The product is also useful for films and sheets.

*Example 16 (hexamethylene glycol)*

Eighty-four g. (0.2 mol) of p,p'-sulfonyl dibenzoic acid butyl ester and 36 g. (0.3 mol) of 1,6-hexanediol were placed in a vessel equipped with a variable speed stirrer of the anchor type, a short distillation column, and a gas inlet tube for purified hydrogen. Two cc. of benzene containing 0.05 g. of Pb (C₂H₅)₄ was added. The mixture was heated in a metal bath at 200–210° C. and stirred at 100–120 R. P. M. while pure hydrogen was passed over the surface. Butyl alcohol distilled off rapidly and the ester interchange was practically complete in 30 minutes. The temperature was then raised to 270–280° in 15 minutes and heating was continued for 10–15 minutes. Some of the excess glycol was distilled off at this stage. The hydrogen gas was shut off and a vacuum of about 1 mm. was applied. The melt rapidly increased in viscosity and in about 15 minutes it was necessary to reduce the stirrer speed to 40 R. P. M. As the viscosity increased the stirrer speed was gradually reduced. After a total time of 30–40 minutes under vacuum, the melt had become too viscous to stir and the reaction was stopped. The melt obtained was clear and colorless. After cooling slowly the product obtained was hard and opaque due to crystallinity. On a hot stage, in polarized light, the crystalline material shows a melting point of 270–280° C. The inherent viscosity in 60% phenol-40% tetrachlorethane is 0.70–0.80. Fibers can be pulled from the melt and cold-drawn 500–600%. They stick on a hot bar at 230–240° C. The polyester also gives valuable sheets and films.

*Example 17 (pentamethylene glycol)*

One hundred g. p,p'-sulfonyldibenzoic acid ethyl ester and 40 g. 1,5-pentanediol were placed in a reaction vessel equipped with a stirrer, a short distillation column, and an inlet tube for purified nitrogen. Two cc. of benzene containing 0.2 g. Pb (CH₃)₄ was added and the mixture was heated at 180–200° C. with stirring. After 1 hour, the distillation of ethyl alcohol ceased, and the temperature was raised to 280–285° C. where it was held for 20 minutes. A vacuum of 0.5 to 1.0 mm. was applied for 1 hour while the temperature is maintained at 280–285° C. A colorless product having an inherent viscosity of 0.80–0.90 in 60% phenol-40% tetrachlorethane solution was obtained. Fibers pulled from the melt and cold-drawn 400–500% show a sticking temperature of 240–250° C. The product is also useful for films and sheets.

*Example 18 (ethylene and hexamethylene glycols)*

A catalyst was prepared by reacting 20 grams of magnesium with 130 g. ethyl bromide in 250 cc. dibutyl ether. Two-tenths of one cc. of this catalyst was added to a mixture of 41.8 g. (0.1 mole) of the butyl ester of p,p'-sulfonyl dibenzoic acid, 17.7 g. (0.15 mole) hexamethylene glycol, and 9.3 g. (0.15 mole) ethylene glycol. The reaction mixture was heated under a stream of hydrogen with constant stirring at 190° for 2 hours and at 280° for ¾ hour. It was then heated under vacuum of 1 mm. of mercury for 5 hours. The product was a high molecular weight polymer which could be spun and cold drawn and had a viscosity of 0.6 in 60% phenol-40% tetrachloroethane solution.

*Example 19 (dodecamethylene glycol)*

The procedure described in Example 1 was repeated exactly except that a molecularly equivalent quantity (2.0 moles) of 1,12-dodecamethylene glycol was employed in lieu of the 1,10-decamethylene glycol. When extruded as filaments and drafted, these polyester fibers had a hot bar sticking temperature of about 170° C.

*Example 20 (octamethylene glycol)*

The procedure described in Example 2 was repeated exactly except that a molecularly equivalent quantity of 1,8-octamethylene glycol was employed in lieu of the 1,6-hexamethylene glycol. When extruded as filaments and drafted, these polyester fibers had a hot bar sticking temperature of about 200–210° C.

The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

In addition to the above examples, the following illustrates that the isomers of p,p'-sulfonyl dibenzoic compounds can be employed to prepare useful polyesters which have, however, much lower softening and melting points and are consequently not useful in preparing fibers. These isomers can be condensed with their short chain glycols (2, 3, or 4 carbon atoms) in order to increase their melting and softening points.

*Example A (m,m'-sulfonyl dibenzoic compound plus butylene glycol)*

Thirty-six (36) grams of the ethyl diester of m,m'-sulfonyldibenzoic acid and 35 g. of 1,4-butanediol were mixed together and 0.03 g. of Ca and 0.02 g. of Mg were added in the form of the alkoxides thereof. The temperature of this mixture was gradually raised to 200° C during the course of 1 hour while pure, dry nitrogen was passed through the reaction vessel. The temperature was then maintained at 180–190° C. for 3–4 hours and then at 280° C. for 30 minutes. The pressure was then reduced from atmospheric pressure to 0.05 mm. of Hg pressure and the melt was heated at 280–290° C. at this pressure for an additional 4 hours. A hard, tough resin was obtained which is useful as a molding plastic. This polyester was not suitable for employment in the preparation of fibers.

What I claim is:

1. A process for preparing a linear polyester comprising (A) condensing a p,p'-sulfonyl dibenzoic compound having the formula:

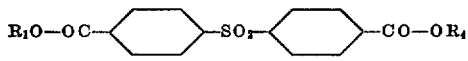

wherein R₁ and R₄ each represents a substituent selected from the group consisting of an omega-hydroxyalkyl radical containing from 3 to 12 carbon atoms and an alkyl radical containing from 1 to 6 carbon atoms, (B) with a dioxy compound having the formula:

$$R_5-O-(CH_2)_p-O-R_6$$

wherein p represents a positive integer of from 5 to 12 inclusive and R₅ and R₆ each represents a substituent selected from the group consisting of a hydrogen atom and an acyl radical containing from 2 to 4 carbon atoms, the dioxy compound being employed in such proportion that there is at least an equivalent amount of substituents in proportion to the carboxy substituents in the over-all combination of the dibenzoic compound and the dioxy compound, (C) in the presence of an ester-interchange catalyst as a condensing agent, (D) at an elevated temperature, (E) in an inert atmosphere, and (F) conducting the latter part of the condensation at a very low pressure of the inert atmosphere, said process encompassing the condensation of only those compounds referred to in (A) and (B) hereinabove.

2. A process as defined in claim 1 wherein the elevated temperature is increased gradually during the course of the condensation up to a temperature of from about 225° to about 310° C.

3. A process as defined in claim 2 wherein the condensing agent is employed in an amount of from about 0.005% to about 0.2%, based on the weight of the sulfonyl dibenzoic compound.

4. A process as defined in claim 3 wherein the dioxy compound is employed in such a proportion that there are from about 1.2 to about 3 oxy substituents in proportion to the carboxy substituents in the over-all combination of the dibenzoic compound and the dioxy compound.

5. A process as defined in claim 4 wherein elevated temperature employed during the earlier part of the condensation is from about 150° to about 220° C. and the low pressure defined under (F) is less than about 15 mm. of Hg pressure.

6. A process as defined in claim 5 wherein the dioxy compound is a glycol having the formula:

$$HO-(CH_2)_p-OH$$

wherein p is defined under (B).

7. A process as defined in claim 6 wherein the inert atmosphere is nitrogen and all materials employed in the process are substantially anhydrous.

8. A process as defined in claim 7 wherein the glycol is 1,5-pentamethylene glycol.

9. A process as defined in claim 7 wherein the glycol is 1,6-hexamethylene glycol.

10. A process as defined in claim 7 wherein the glycol is 1,8-octamethylene glycol.

11. A process as defined in claim 7 wherein the glycol is 1,9-nonamethylene glycol.

12. A process as defined in claim 7 wherein the glycol is 1,10-decamethylene glycol.

13. A process as defined in claim 1 wherein the sulfonyl dibenzoic compound is a diester which is formed by a preliminary step comprising condensing a p,p'-sulfonyl dibenzoic acid with a dioxy compound which is defined under (B) and is employed in such a proportion that there is at least an equivalent amount of oxy substituents in proportion to the carboxy substituents in the over-all combination of the dibenzoic acid and the dioxy compound, at an elevated temperature, after which preliminary step the condensing agent which is defined under (C) is added and the condensation is completed as defined under (D), (E) and (F).

14. A process as defined in claim 13 wherein the elevated temperature is increased gradually during the course of the condensation up to a temperature of from about 225° to about 310° C.

15. A process as defined in claim 14 wherein the elevated temperature employed during the preliminary step is substantially that at which reflux conditions subsist and the dioxy compound is employed in such a proportion that there are from about 1.2 to about 3 hydroxy substituents in proportion to the carboxy substituents in the over-all combination of the dibenzoic acid diester and the dioxy compound.

16. A process as defined in claim 15 wherein the condensing agent is employed in an amount of from about 0.005% to about 0.2%, based on the weight of the sulfonyl dibenzoic acid diester, the elevated temperature employed during the earlier part of the condensation to form the polyester is from about 150° C. to about 220° C. and the low pressure defined under (F) is less than about 15 mm. of Hg pressure.

17. A linear highly polymeric polyester having a melting point of from about 180° C. to about 280° C. consisting of the following repeating units:

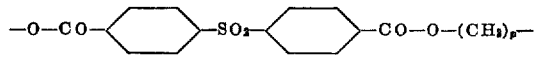

wherein p represents a positive integer of from 5 to 12 and which is capable of being spun into fibers which can be cold drawn to from about 3 to 6 times their originally spun length, thereby developing strong elastic properties.

18. A linear highly polymeric polyester as defined in claim 17 wherein p is 5.

19. A linear highly polymeric polyester as defined in claim 17 wherein p is 6.

20. A linear highly polymeric polyester as defined in claim 17 wherein p is 8.

21. A linear highly polymeric polyester as defined in claim 17 wherein p is 9.

22. A linear highly polymeric polyester as defined in claim 17 wherein p is 10.

23. A linear highly polymeric polyester having a melting point of from about 180° C. to about 280° C. consisting of a major proportion of the following repeating units:

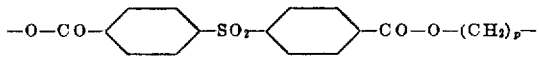

wherein $p$ represents a positive integer of from 5 to 12 and a minor proportion of the following repeating units:

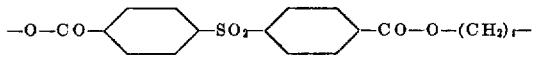

wherein $t$ represents a positive integer of from 2 to 4 and which is capable of being formed into fibers which can be cold drawn to from about 3 to 6 times their originally spun length, thereby developing strong elastic properties.

24. A linear highly polymeric polyester as defined in claim 23 wherein $p$ is 5 and $t$ is 2.

25. A linear highly polymeric polyester as defined in claim 23 wherein $p$ is 6 and $t$ is 2.

26. A linear highly polymeric polyester as defined in claim 23 wherein $p$ is 8 and $t$ is 2.

27. A linear highly polymeric polyester as defined in claim 23 wherein $p$ is 9 and $t$ is 2.

28. A linear highly polymeric polyester as defined in claim 23 wherein $p$ is 10 and $t$ is 2.

References Cited in the file of this patent

UNITED STATES PATENTS

| 2,465,319 | Whinfield et al. | Mar. 22, 1949 |
| 2,547,113 | Drewitt et al. | Apr. 3, 1951 |

FOREIGN PATENTS

| 621,977 | Great Britain | Apr. 25, 1949 |

Disclaimer 2,744,089.—*John R. Caldwell*, Kingsport, Tenn. LINEAR HIGHLY POLYMERIC POLYESTERS FROM P,P' SULFONYL DIBENZOIC ACID AND PENTAMETHYLENE OR HIGHER GLYCOLS. Patent dated May 1, 1956. Disclaimer filed Feb. 1, 1965, by the assignee, *Eastman Kodak Company*.

Hereby enters this disclaimer to claims 17–28 inclusive of said patent.

[*Official Gazette May 11, 1965.*]